US011775998B2

(12) United States Patent
Oka et al.

(10) Patent No.: US 11,775,998 B2
(45) Date of Patent: Oct. 3, 2023

(54) INFORMATION PROCESSING DEVICE, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Naoya Oka, Nagakute (JP); Satoshi Kitamura, Nagoya (JP); Yusuke Sobue, Nagoya (JP); Seira Nakada, Nagoya (JP); Mami Mori, Nagoya (JP); Masato Morishima, Nagoya (JP); Yasuyuki Nunokawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/752,983

(22) Filed: May 25, 2022

(65) Prior Publication Data

US 2022/0398617 A1 Dec. 15, 2022

(30) Foreign Application Priority Data

Jun. 11, 2021 (JP) ................................ 2021-097972

(51) Int. Cl.
| G06Q 30/00 | (2023.01) |
| G06Q 30/0207 | (2023.01) |
| G06Q 10/02 | (2012.01) |
| G06Q 10/20 | (2023.01) |
| G06Q 30/0645 | (2023.01) |

(52) U.S. Cl.
CPC ......... *G06Q 30/0207* (2013.01); *G06Q 10/02* (2013.01); *G06Q 10/20* (2013.01); *G06Q 30/0645* (2013.01)

(58) Field of Classification Search
None
See application file for complete search history.

(56) References Cited

U.S. PATENT DOCUMENTS

| 10,013,697 | B1* | 7/2018 | Cote .................. G06Q 30/0207 |
| 10,915,964 | B1* | 2/2021 | Purgatorio ......... G06Q 30/0226 |
| 10,964,215 | B1* | 3/2021 | Papineau ............... G08G 1/146 |
| 11,132,653 | B1* | 9/2021 | Bolt ...................... G06Q 20/023 |
| 2002/0107665 | A1* | 8/2002 | Tyson ................. A47L 15/0049 |
| | | | 702/183 |
| 2002/0165695 | A1* | 11/2002 | Tyson ................. A47L 15/0049 |
| | | | 702/182 |
| 2007/0124043 | A1* | 5/2007 | Ayoub .................. H03J 1/0025 |
| | | | 701/1 |
| 2008/0040129 | A1* | 2/2008 | Cauwels ................ G06Q 10/20 |
| | | | 705/305 |
| 2011/0011422 | A1* | 1/2011 | Jeon ......................... F24C 14/02 |
| | | | 134/57 R |

(Continued)

FOREIGN PATENT DOCUMENTS

JP 2015-122107 A 7/2015

*Primary Examiner* — Luis A Brown
(74) *Attorney, Agent, or Firm* — Sughrue Mion, PLLC

(57) ABSTRACT

An information processing device includes a controller configured to acquire a record of a predetermined action for maintaining a commercial value of a first vehicle by a first user who rents the first vehicle from a first service that is a vehicle rental service, and provide an incentive to the first user when the record of the predetermined action is at a level equal to or higher than a predetermined reference.

19 Claims, 9 Drawing Sheets

(56) References Cited

U.S. PATENT DOCUMENTS

| | | | |
|---|---|---|---|
| 2011/0063099 A1* | 3/2011 | Miller | G07C 5/085 340/439 |
| 2011/0223895 A1* | 9/2011 | Wagda | H04W 4/23 455/414.2 |
| 2011/0270643 A1* | 11/2011 | Reichman | G06Q 10/109 705/7.19 |
| 2015/0081404 A1* | 3/2015 | Basir | G06Q 30/08 705/14.1 |
| 2015/0310467 A1* | 10/2015 | Klampfl | G08G 1/005 705/7.35 |
| 2016/0315836 A1* | 10/2016 | Hill | G06F 21/00 |
| 2017/0045369 A1* | 2/2017 | Kim | G01C 21/3685 |
| 2017/0187788 A1* | 6/2017 | Botea | H04L 67/52 |
| 2018/0276903 A1* | 9/2018 | Rai | H04W 4/40 |
| 2018/0330475 A1* | 11/2018 | Tokatyan | G06T 7/001 |
| 2019/0066249 A1* | 2/2019 | Decaluwe | G06Q 30/0282 |
| 2019/0187716 A1* | 6/2019 | Cantrell | G05D 1/0225 |
| 2019/0197325 A1* | 6/2019 | Reiley | G08B 13/19602 |
| 2020/0175783 A1* | 6/2020 | Adams | G07C 5/0891 |
| 2020/0184500 A1* | 6/2020 | Yuyama | B60W 40/09 |
| 2020/0234515 A1* | 7/2020 | Gronsbell | G06F 16/25 |
| 2020/0238953 A1* | 7/2020 | Spasovski | G01C 21/3407 |
| 2020/0242858 A1* | 7/2020 | Meroux | G07C 5/085 |
| 2020/0349661 A1* | 11/2020 | Dutta | G06Q 50/163 |
| 2021/0003413 A1* | 1/2021 | Woo | G01C 21/3605 |
| 2021/0097314 A1* | 4/2021 | Scanlon | G06V 20/584 |
| 2021/0125322 A1* | 4/2021 | Ventimiglia | G07C 5/0825 |
| 2021/0133695 A1* | 5/2021 | Nichols | G06Q 10/20 |
| 2021/0272188 A1* | 9/2021 | Kobayashi | G06Q 30/0645 |
| 2022/0163335 A1* | 5/2022 | Beaurepaire | G01C 21/3492 |
| 2022/0327442 A1* | 10/2022 | Persia | G06N 20/00 |

* cited by examiner

FIG. 5

RESERVATION WILL BE MADE FOR DETAILS BELOW.
DO YOU WANT TO CONFIRM RESERVATION?

TYPE OF WORK: CAR WASHING

FEE: ○○○○ YEN

SHOP NAME: □□□□

ADDRESS: ▲▲▲▲

DATE AND TIME OF WORK: (YEAR) / (MONTH) / (DAY) / (TIME)

CONFIRM    CANCEL     — D6

FIG. 6

| USER ID | VEHICLE ID | CONTRACT PERIOD | MONTHLY FEE | USAGE RESTRICTION |
|---|---|---|---|---|
| U001 | V001 | ***// ~ //** | ××××YEN | ○○○○ km/ MONTH |

FIG. 7

| VEHICLE ID | USER ID | RECORD | |
| --- | --- | --- | --- |
| | | TYPE OF WORK | OCCURRENCE COUNT |
| V001 | U001 | CAR WASHING | 2 TIMES / MONTH |
| | | BODY COATING | 1 TIME / MONTH |
| | | ⋮ | ⋮ |

INFORMATION PROCESSING DEVICE, INFORMATION PROCESSING METHOD, AND INFORMATION PROCESSING SYSTEM

CROSS-REFERENCE TO RELATED APPLICATION

This application claims priority to Japanese Patent Application No. 2021-097972 filed on Jun. 11, 2021, incorporated herein by reference in its entirety.

BACKGROUND

1. Technical Field

The present disclosure relates to a vehicle rental service.

2. Description of Related Art

There is known a type of contract that allows a user to rent a vehicle for a certain period. This type of contract is also called "lease contract", "subscription contract", or the like. For example, Japanese Unexamined Patent Application Publication No. 2015-122107 (JP 2015-122107 A) discloses, as a technology related to this type of contract, a system that provides a car wash service to users free of charge depending on whether they have a lease contract.

SUMMARY

The present disclosure provides an effective technology for suppressing a decrease in a commercial value of a vehicle to be used for a rental service.

A first aspect of the present disclosure relates to an information processing device including a controller. The controller is configured to acquire a record of a predetermined action for maintaining a commercial value of a first vehicle by a first user who rents the first vehicle from a first service that is a vehicle rental service, and provide an incentive to the first user when the record of the predetermined action is at a level equal to or higher than a predetermined reference.

The predetermined action may have an action for washing the first vehicle, and the controller may be configured to determine that the record of the predetermined action is at a level equal to or higher than the predetermined reference when a frequency of occurrence of the action for washing the first vehicle is equal to or higher than a first threshold.

The predetermined action may have an action for coating a body of the first vehicle, and the controller may be configured to determine that the record of the predetermined action is at a level equal to or higher than the predetermined reference when a frequency of occurrence of the action for coating the body of the first vehicle is equal to or higher than a second threshold.

The predetermined action may have an action for parking the first vehicle at a place having a low parking density in a public parking lot, and the controller may be configured to determine that the record of the predetermined action is at a level equal to or higher than the predetermined reference when a ratio of a first occurrence frequency of the action for parking the first vehicle at the place having the low parking density in the public parking lot to a second occurrence frequency of an action for parking the first vehicle in the public parking lot is equal to or higher than a third threshold.

The predetermined action may have an action for using a second service related to maintenance of a vehicle commercial value, and the controller may be configured to determine that the record of the predetermined action is at a level equal to or higher than the predetermined reference when a third occurrence frequency of the action for using the second service is equal to or higher than a fourth threshold.

The second service may be a platform service that acts as a proxy for a procedure to make a work request on a business operator that performs work for maintaining the vehicle commercial value.

The first service may be a service that grants a right to use the first vehicle to the first user by periodically receiving payment of a fee from the first user, and the controller may be configured to reduce the fee as provision of the incentive.

The first service may be a service in which an upper limit is set on a traveling distance of the first vehicle, and the controller may be configured to increase the upper limit as provision of the incentive.

The controller may be configured to provide, as provision of the incentive, a right to modify a function different from a function related to traveling performance of the first vehicle.

A second aspect of the present disclosure relates to an information processing method. The information processing method includes a first step of acquiring a record of a predetermined action for maintaining a commercial value of a first vehicle by a first user who rents the first vehicle from a first service that is a vehicle rental service, and a second step of providing an incentive to the first user when the record of the predetermined action is at a level equal to or higher than a predetermined reference.

The predetermined action may have an action for using a second service related to maintenance of a vehicle commercial value, and the second step may be a step of determining that the record of the predetermined action is at a level equal to or higher than the predetermined reference when an occurrence frequency of the action for using the second service in a predetermined period is equal to or higher than a fourth threshold.

The second service may be a platform service that acts as a proxy for a procedure to make a work request on a business operator that performs work for maintaining the vehicle commercial value.

The first service may be a service that grants a right to use the first vehicle to the first user by periodically receiving payment of a fee from the first user, and in the second step, the fee may be reduced as provision of the incentive.

The first service may be a service in which an upper limit is set on a traveling distance of the first vehicle, and in the second step, the upper limit may be increased as provision of the incentive.

In the second step, a right to modify a function different from a function related to traveling performance of the first vehicle may be provided as provision of the incentive.

A third aspect of the present disclosure relates to an information processing system including a first device configured to perform a process related to a first service that is a vehicle rental service, and a second device configured to provide online a second service related to maintenance of a vehicle rented in the first service. The first device is configured to acquire, from the second device, a record of usage of the second service by a first user who rents a first vehicle from the first service, and provide an incentive to the first user when the record of usage of the second service is at a level equal to or higher than a predetermined reference.

The first device may be configured to determine that the record of usage of the second service is at a level equal to or higher than the predetermined reference when an occurrence frequency of an action for using the second service is equal to or higher than a fourth threshold.

The first service may be a service that grants a right to use the first vehicle to the first user by periodically receiving payment of a fee from the first user, and the first device may be configured to reduce the fee as provision of the incentive.

The first service may be a service in which an upper limit is set on a traveling distance of the first vehicle, and the first device may be configured to increase the upper limit as provision of the incentive.

The first device may be configured to provide, as provision of the incentive, a right to modify a function different from a function related to traveling performance of the first vehicle.

Other aspects of the present disclosure relate to an information processing program for causing a computer to execute the information processing method, or a non-transitory storage medium storing the information processing program.

According to the first aspect, the second aspect, and the third aspect of the present disclosure, it is possible to provide an effective technology for suppressing a decrease in the commercial value of the vehicle to be used for the rental service.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing a third example of the screen displayed on the browser of the user terminal;

FIG. 6 is a diagram showing a structural example of a contract information table;

FIG. 7 is a diagram showing a structural example of a record information table;

DETAILED DESCRIPTION OF EMBODIMENTS

Figure 1:
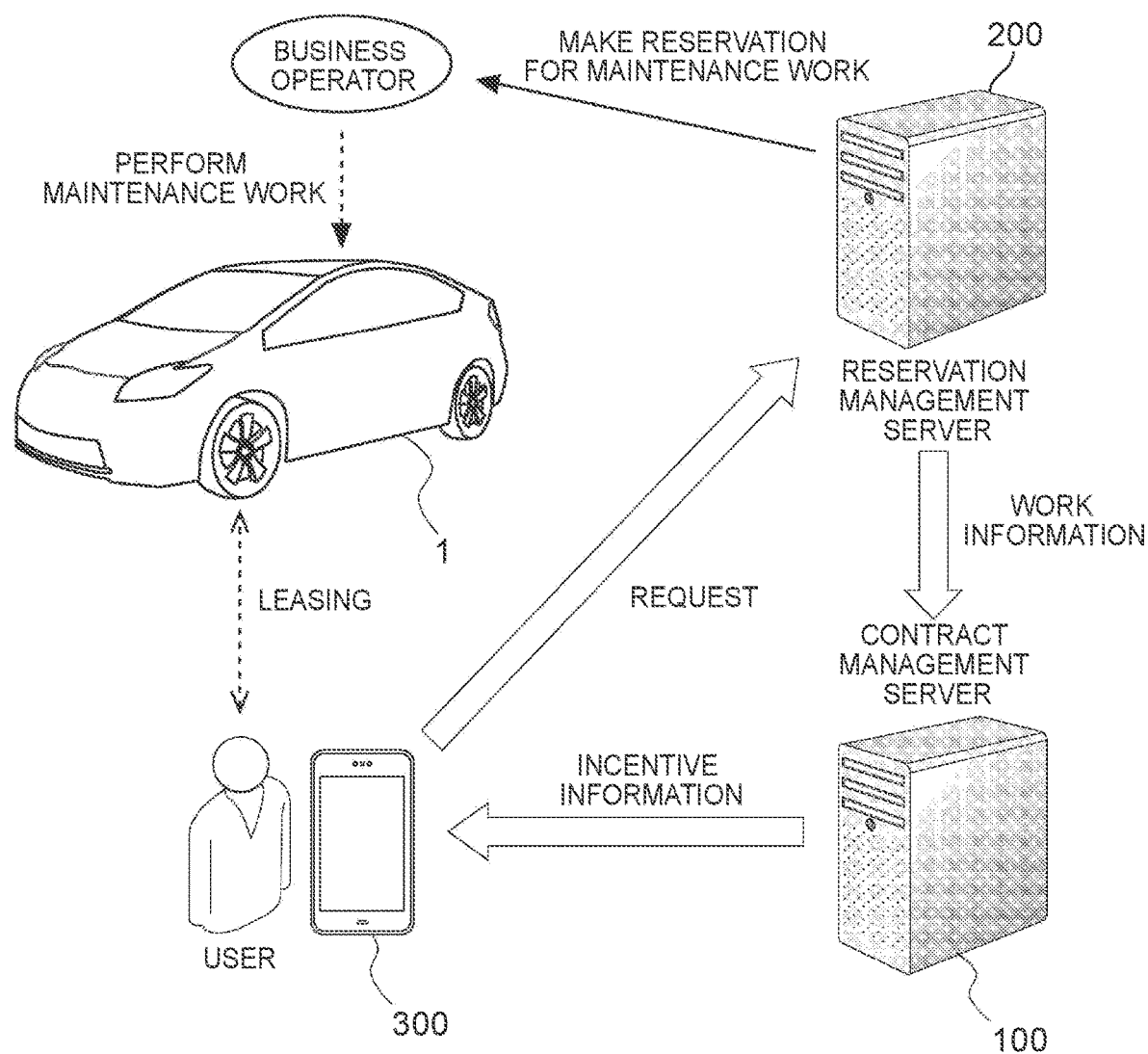
FIG. 1 is a diagram showing an outline of a vehicle leasing system.

An information processing device according to one aspect of the present disclosure performs a process related to a vehicle rental service. The rental service is, for example, a service that grants a right to use a vehicle to a user by periodically (for example, monthly or yearly) receiving payment of a fee from the user in a contract period. Such a rental service is also referred to as "lease" or "subscription" (may hereinafter be referred to as "first service").

After the end of the contract period of the first service, the vehicle may be rented to another user or sold as a used vehicle. As the commercial value of the vehicle increases, a borrower or buyer is more likely to appear and the vehicle may be rented or sold at a higher price. The commercial value of a vehicle tends to increase as the conditions of parts of the vehicle are closer to the conditions at the time of a new vehicle. Therefore, when a decrease in the commercial value of the vehicle in the contract period can further be suppressed, the vehicle after the end of the contract period can be utilized effectively.

In view of the above, the information processing device according to the present disclosure performs a process for motivating the user who is using the first service to maintain the commercial value of the vehicle. Specifically, a control unit of the information processing device acquires a record of a predetermined action for maintaining a commercial value of a first vehicle by a first user who rents the first vehicle from the first service. The control unit provides an incentive to the first user when the record of the predetermined action of the first user is at a level equal to or higher than a predetermined reference. Therefore, the first user who is using the first service can be motivated to take the predetermined action. As a result, the decrease in the commercial value of the vehicle in the contract period can further be suppressed.

The "predetermined action" in the present disclosure may be an action involving work that is not included in the first service among actions for maintaining the commercial value of the first vehicle. Examples of the predetermined action include actions for suppressing deterioration of the body of the first vehicle. When the deterioration of the body of the first vehicle in the contract period can be suppressed, the commercial value of the first vehicle after the end of the contract period can be increased.

The deterioration of the body of the first vehicle includes deterioration of a body coat. One of the effective methods for suppressing the deterioration of the body coat is to wash the first vehicle at a certain frequency. Therefore, the control unit of the information processing device according to the present disclosure may determine that the record of the predetermined action is at a level equal to or higher than the predetermined reference when a frequency of occurrence of the action for washing the first vehicle is equal to or higher than a first threshold. As a result, the first user can be motivated to wash the first vehicle at the frequency equal to or higher than the first threshold. The first threshold is the minimum car washing frequency that can suppress the deterioration of the body coat, such as a frequency at which the car washing is performed about twice a month. The car washing work may be performed by the first user or by a business operator that has received a request from the first user. Therefore, the action for washing the first vehicle includes an action of washing the first vehicle by the first user, and an action of requesting, by the first user, the business operator to wash the first vehicle.

The effective methods for suppressing the deterioration of the body coat also include a method of coating the body of the first vehicle at a certain frequency. Therefore, the control unit of the information processing device according to the present disclosure may determine that the record of the predetermined action is at a level equal to or higher than the predetermined reference when a frequency of occurrence of an action for coating the body of the first vehicle is equal to or higher than a second threshold. As a result, the first user can be motivated to coat the body of the first vehicle at the frequency equal to or higher than the second threshold. The second threshold is the minimum coating frequency that can suppress the deterioration of the body coat, such as a frequency at which the body coating is performed at intervals of several months or several years. The body coating work may be performed by the first user or by a business operator that has received a request from the first user. Therefore, the action for coating the body of the first vehicle includes an action of coating the body by the first user, and an action of requesting, by the first user, the business operator to coat the body.

The deterioration of the body of the first vehicle includes damage to the body. One of the effective methods for suppressing the damage to the body is, for example, to park the first vehicle at a place where the first vehicle is not easily damaged by another vehicle in a public parking lot. Examples of the place where the first vehicle is not easily damaged by another vehicle include a place (parking area) having a low parking density in a public parking lot. Therefore, the control unit of the information processing device according to the present disclosure may determine that the record of the predetermined action is at a level equal to or higher than the predetermined reference when a ratio of a frequency of occurrence of an action for parking the first vehicle at the place having the low parking density in the public parking lot to a frequency of occurrence of an action for parking the first vehicle in the public parking lot is equal to or higher than a third threshold. As a result, when parking the first vehicle in the public parking lot, the first user can be motivated to park the first vehicle at the place having the low parking density. The third threshold is, for example, a ratio equal to or higher than 60% to 70%.

The "predetermined action" in the present disclosure may be an action for using a second service related to maintenance of a commercial value of a vehicle. The second service provides, for example, maintenance work that is not included in the first service (for example, vehicle washing or vehicle body coating) among some types of maintenance work effective in maintaining the commercial value of the vehicle. As the frequency of use of the second service increases, it is more likely to maintain the commercial value of the first vehicle. Therefore, the control unit of the information processing device according to the present disclosure may determine that the record of the predetermined action is at a level equal to or higher than the predetermined reference when a frequency of occurrence of the action for using the second service is equal to or higher than a fourth threshold. As a result, the first user can be motivated to use the second service at the frequency equal to or higher than the fourth threshold. The fourth threshold is the minimum frequency of use that can maintain the commercial value of the first vehicle.

The second service may be operated by a business operator that performs maintenance work, but may be operated by a provider of the first service or a business operator related to the provider of the first service. When the second service is operated by the provider of the first service or the business operator related to the provider of the first service, the second service may be a platform service that acts as a proxy for a procedure to make a work request on the business operator that provides the maintenance work.

When the first service is a service that grants a right to use the first vehicle to the first user by periodically receiving payment of a fee from the first user, the control unit may reduce the fee as the provision of the incentive.

When the first service is a service in which an upper limit is set on a traveling distance of the first vehicle, the control unit may increase the upper limit as the provision of the incentive.

The control unit may provide, as the provision of the incentive, a right to modify a function different from a function related to traveling performance of the first vehicle. Examples of the action to "modify a function different from a function related to traveling performance of the first vehicle" include a change of a lighting method of a blinker to a lighting method different from a default lighting method, a change of a display design of an instrument panel to a display design different from a default display design, and an upgrade of contents that can be reproduced on an in-vehicle multimedia device.

Embodiment

Hereinafter, a specific embodiment of the present disclosure will be described with reference to the drawings. Configurations described in the present embodiment are not intended to limit the technical scope of the present disclosure to those configurations alone unless otherwise specified.

Outline of System

FIG. 1 is a diagram showing an outline of a vehicle leasing system to which an information processing device according to the present disclosure is applied. The vehicle leasing system in the present embodiment includes a contract management server 100 that manages lease contracts of a vehicle 1, a reservation management server 200 that makes reservations for maintenance work for the vehicle 1, and a user terminal 300.

The contract management server 100 is a server device that performs various processes related to a lease service of the vehicle 1 (corresponding to a "first service" according to the present disclosure), and is an example of an "information processing device (first device)" according to the present disclosure. The contract management server 100 is operated by a first business operator, and manages lease contracts between the first business operator and users. The lease contract is a contract that allows the user to register with a public institution as a user of the vehicle 1 owned by the first business operator in exchange for monthly usage fee payments. The contract period of the lease contract can be selected by the user from a plurality of periods (for example, 3 years, 5 years, and 7 years) determined by the first business operator.

The contract management server 100 determines an incentive to be provided to the user based on a record of a predetermined action of the user, and transmits information related to the determined incentive (incentive information) to the user terminal 300 of the user. The predetermined action in this example is an action of requesting a business operator to perform maintenance work for the vehicle 1 via the reservation management server 200 described later among actions for maintaining the commercial value of the vehicle 1.

The reservation management server 200 is a server device that performs various processes related to a reservation service for maintenance work (corresponding to a "second service" according to the present disclosure), and is an example of a "second device" according to the present disclosure. The reservation management server 200 is operated by a second business operator, and manages reservations for maintenance work that can be provided by a business operator affiliated with the second business operator. The maintenance work that can be provided by the business operator affiliated with the second business operator is effective maintenance work for maintaining the commercial value of the vehicle 1. Examples of such maintenance work include washing of the vehicle 1 and body coating of the vehicle 1.

The reservation management server 200 makes a reservation for maintenance work based on a request from the user terminal 300. The request is a message for requesting a reservation for maintenance work desired by the user. The reservation for the maintenance work is made to the business operator that can provide the maintenance work desired by the user. The reservation management server 200 provides information related to the reserved maintenance work (work information) to the contract management server 100. The work information may be provided from the reservation management server 200 to the contract management server 100 when the reservation for the maintenance work is completed or when the maintenance work is completed by the business operator.

The user terminal 300 is a computer that is used by a user who has a lease contract for the vehicle 1 with the first business operator. The user can access the reservation management server 200 via the user terminal 300 and request a reservation for maintenance work.

System Configuration

Figure 2:
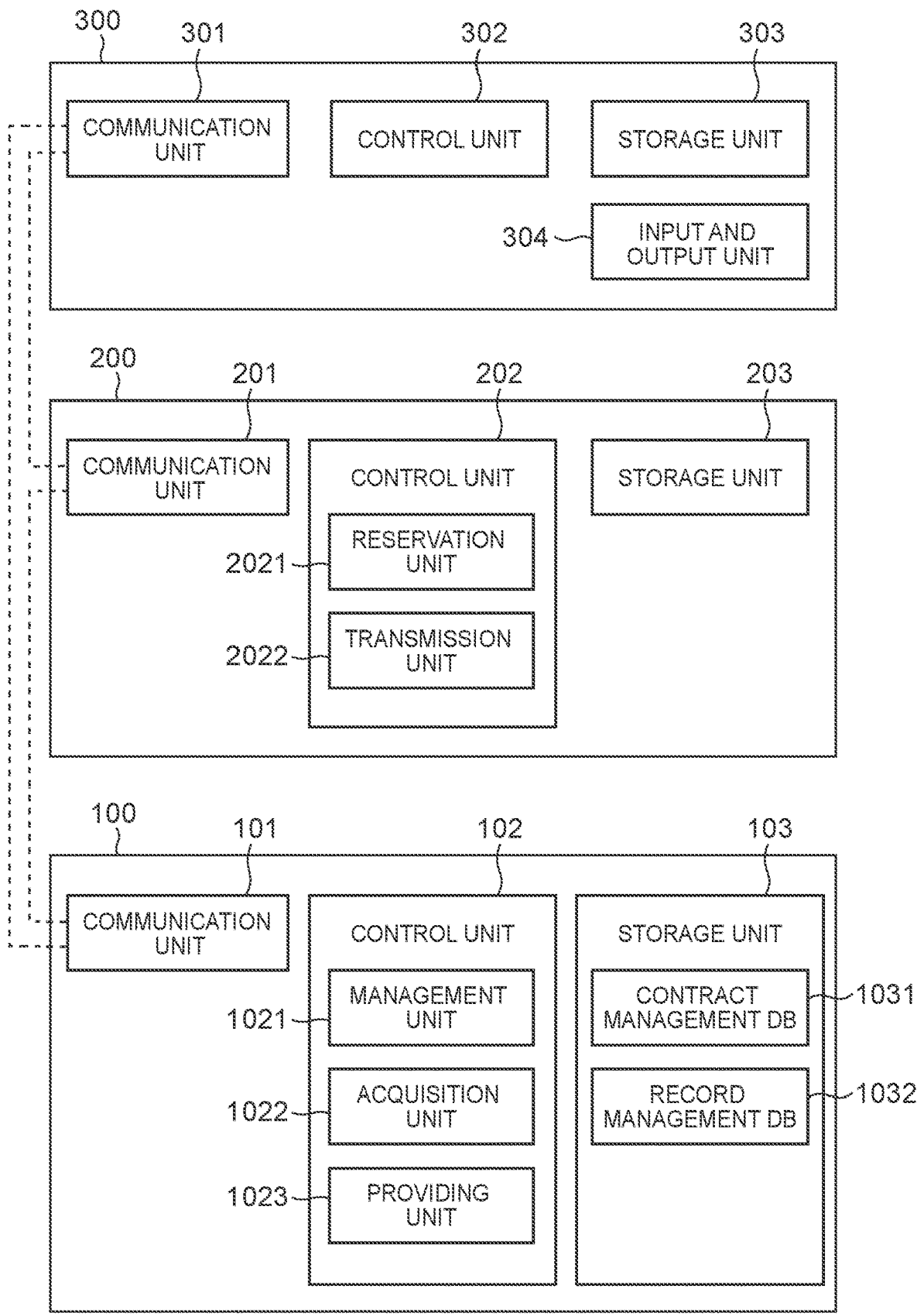
FIG. 2 is a block diagram schematically showing configurations of a contract management server, a reservation management server, and a user terminal in the vehicle leasing system.

FIG. 2 is a block diagram schematically showing a configuration example of the contract management server 100, the reservation management server 200, and the user terminal 300 in the vehicle leasing system according to the present embodiment.

The user terminal 300 is a computer to be used by an individual, such as a personal computer, a smartphone, a mobile phone, a tablet computer, or a personal information terminal. The user terminal 300 includes a communication unit 301, a control unit 302, a storage unit 303, and an input and output unit 304.

The communication unit 301 is a communication interface for connecting the user terminal 300 to a network. The communication unit 301 is connected to the network by using a communication network such as a local area network (LAN). The communication unit 301 may be connected to the network by using a mobile communication service such as 5th-Generation (5G) or Long Term Evolution (LTE), or a wireless communication network such as Wi-Fi (registered trademark). The network is a wide area network (WAN) that is a global public communication network such as the Internet, or any other communication network. The communication unit 301 communicates with other devices (for example, the contract management server 100 or the reservation management server 200) via the network.

The control unit 302 is an arithmetic unit responsible for control that is performed by the user terminal 300. The control unit 302 includes a processor such as a central processing unit (CPU) or a digital signal processor (DSP). The control unit 302 in this example has a function of implementing interaction with the user. For example, the control unit 302 implements a function of presenting, to the user, maintenance work for which a reservation can be made via the reservation management server 200, a function of receiving a user's operation for selecting desired maintenance work, and a function of transmitting a request for the maintenance work selected by the user to the reservation management server 200. These functions are implemented, for example, by a web browser operating on the user terminal 300 or an application program installed on the user terminal 300.

The storage unit 303 includes a main storage device and an auxiliary storage device. The main storage device is used as a recording area for loading a program stored in the auxiliary storage device, or as a buffer for temporarily storing, for example, a calculation result of the control unit 302. The main storage device includes a semiconductor memory such as a read only memory (ROM) or a random access memory (RAM). The auxiliary storage device stores, for example, a program to be executed by the control unit 302, and data to be used when the control unit 302 executes the program. The auxiliary storage device includes, for example, an erasable programmable ROM (EPROM) or a hard disk drive (HDD). The auxiliary storage device may include a removable medium, that is, a portable recording medium. The removable medium is, for example, a disc recording medium such as a compact disc (CD) or a digital versatile disc (DVD), or a universal serial bus (USB) memory. The programs to be stored in the auxiliary storage device may include an application program for implementing the interaction in addition to an operating system (OS). A part or all of the information stored in the auxiliary storage device may be stored in the main storage device.

The input and output unit 304 receives an input operation performed by the user and presents information to the user. The input and output unit 304 includes, for example, a touch panel display and its control circuit.

The configuration of the user terminal 300 is not limited to the example shown in FIG. 2, and any component may be added, changed, or omitted as appropriate.

Next, the reservation management server 200 will be described. The reservation management server 200 is a device that presents, to the user, maintenance work that can be provided by the business operator affiliated with the second business operator and makes a reservation for maintenance work selected by the user. The reservation management server 200 may implement a web server for interaction with the user terminal 300. In that case, the user terminal 300 accesses the web server via the browser to present, to the user, maintenance work for which a reservation can be made via the reservation management server 200. The user terminal 300 can send a request for maintenance work selected by the user to the reservation management server 200 via the browser. As a result, the user can easily make a reservation for the maintenance work. The reservation management server 200 may provide the service by means other than the web server. For example, the reservation management server 200 may execute an interaction service by using an application program installed in the user terminal 300 and a predetermined protocol.

The reservation management server 200 that implements the functions described above can be configured by a general-purpose computer. That is, the reservation management server 200 includes a communication unit 201, a control unit 202, and a storage unit 203.

The communication unit 201 is a communication interface for connecting the reservation management server 200 to the network. For example, the communication unit 201 is connected to the network via a LAN or Wi-Fi (registered trademark), and communicates with other devices (for example, the contract management server 100 or the user terminal 300) via the network.

The control unit 202 includes a processor and is responsible for control that is performed by the reservation management server 200. The control unit 202 in this example includes functional modules such as a reservation unit 2021 and a transmission unit 2022. These functional modules are implemented by the processor executing a program stored in the storage unit 203. A part or all of these functional modules may be implemented by a hardware circuit such as an application specific integrated circuit (ASIC) or a field programmable gate array (FPGA).

The reservation unit 2021 implements the web server and interacts with the user terminal 300. For example, the reservation unit 2021 causes the browser of the user terminal 300 to display a screen shown in FIG. 3. That is, the reservation unit 2021 causes the browser of the user terminal 300 to display a screen including a pull-down menu for selecting maintenance work (D1 in FIG. 3), a pull-down menu for selecting a date and time of work (D2 in FIG. 3), a pull-down menu for selecting a work area (D3 in FIG. 3), and a search button for executing a search for a business operator that meets conditions selected in D1 to D3 in FIG. 3 (D4 in FIG. 3).

Figure 3:
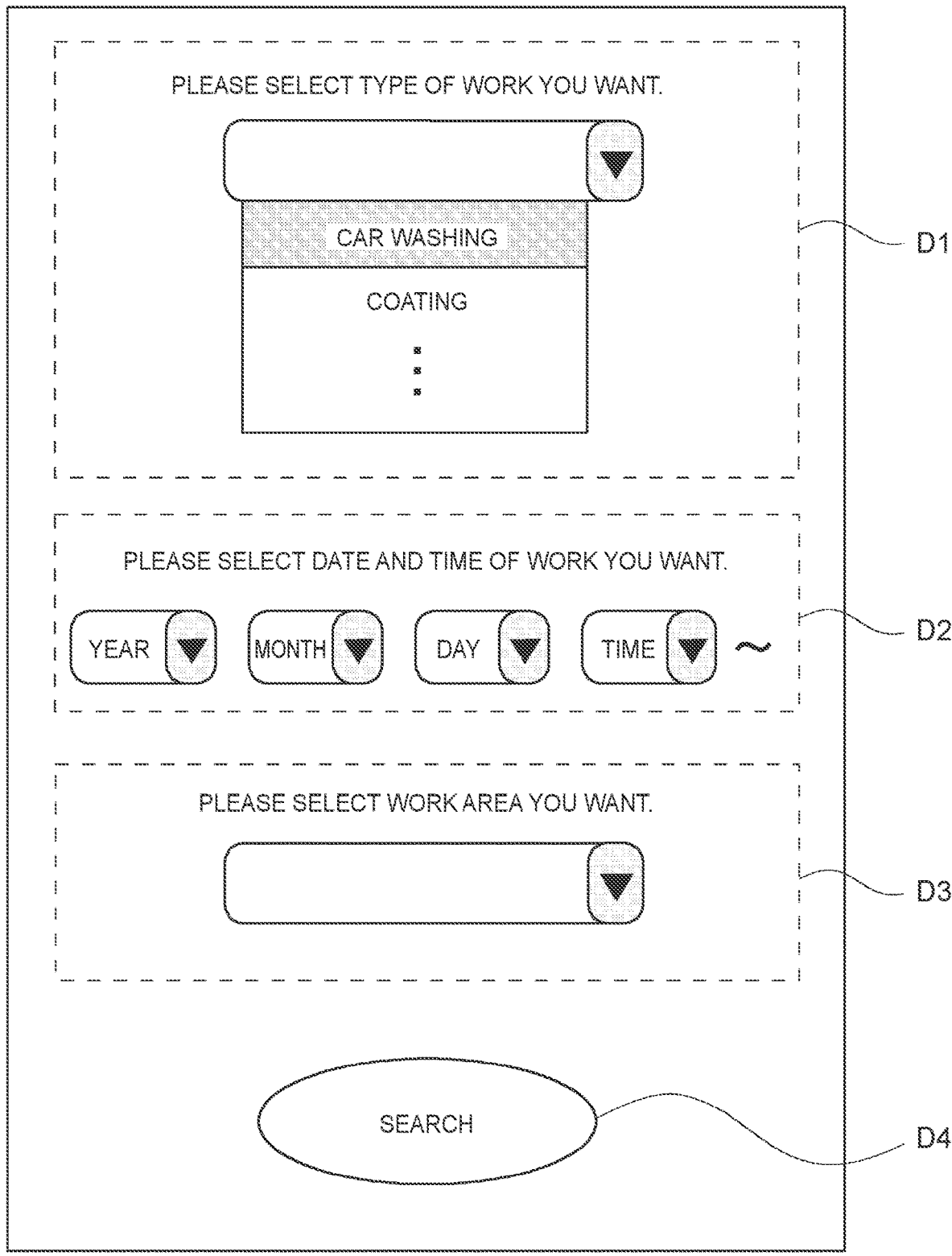
FIG. 3 is a diagram showing a first example of a screen displayed on a browser of the user terminal.

When the search button is operated with the maintenance work, the date and time of work, and the work area selected on the screen shown in FIG. 3, the reservation unit 2021 extracts business operators that meet the selected conditions from the business operators affiliated with the second business operator. When the business operators that meet the selected conditions are extracted, the reservation unit 2021 causes the browser of the user terminal 300 to display a screen shown in FIG. 4. That is, the reservation unit 2021 causes the browser of the user terminal 300 to display a screen including buttons describing information (for example, type of work, fee, shop name, and address) related to the business operators that meet the selected conditions (D5 in FIG. 4). The example of FIG. 4 shows a screen when a plurality of business operators that meets the selected conditions is extracted.

Figure 4:
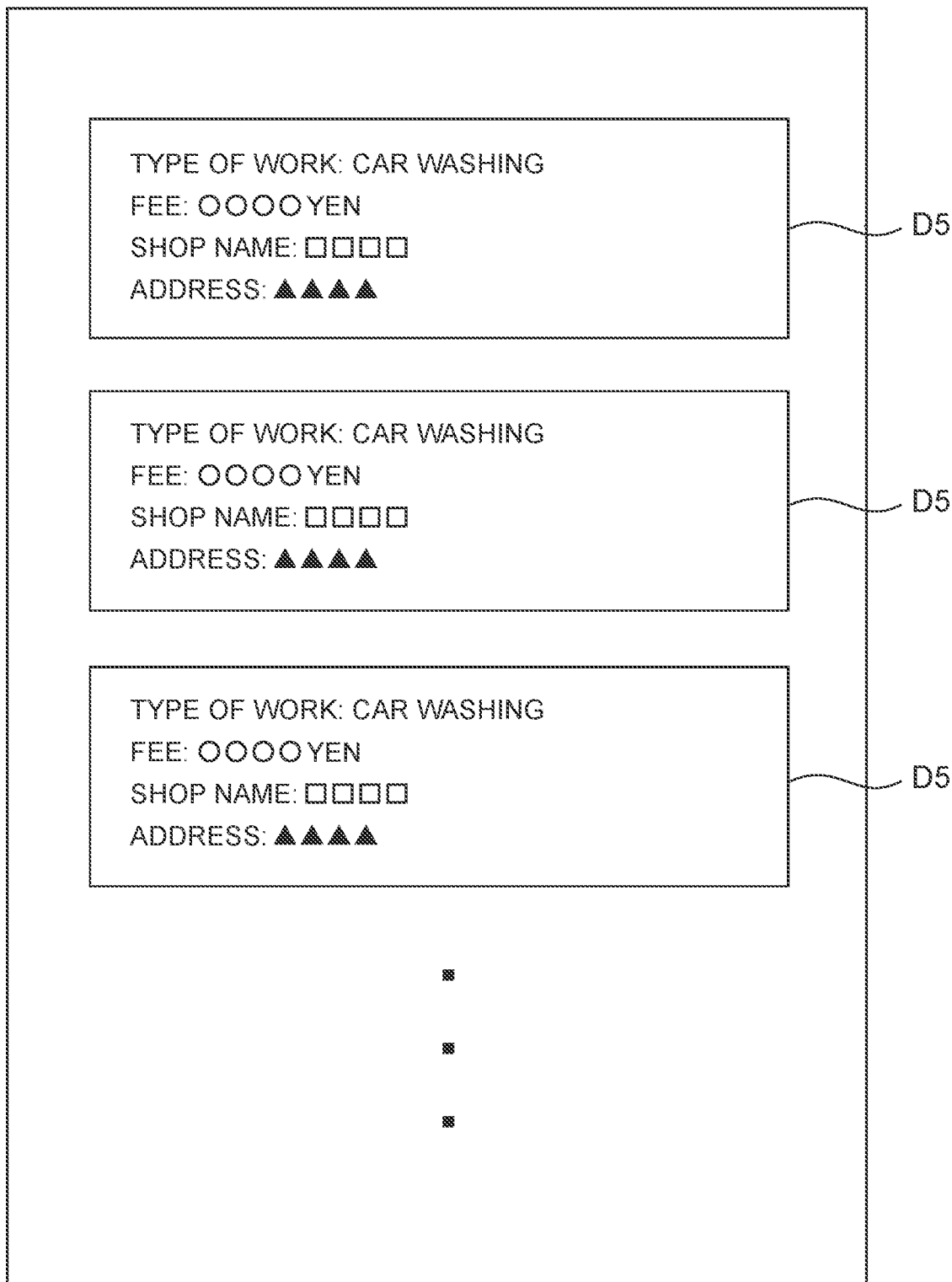
FIG. 4 is a diagram showing a second example of the screen displayed on the browser of the user terminal.

When one of the buttons D5 is selected on the screen shown in FIG. 4, the reservation unit 2021 causes the browser of the user terminal 300 to display a screen shown in FIG. 5. That is, the reservation unit 2021 causes the browser of the user terminal 300 to display a screen including text information indicating the conditions selected by the user (for example, type of work, fee, shop name, address, and date and time of work), and buttons for selecting execution or cancellation of the reservation (D6 in FIG. 5). When the cancellation button is selected on the screen shown in FIG. 5, the screen displayed on the user terminal 300 may return to the screen in FIG. 3 or FIG. 4. When the reservation button is selected on the screen shown in FIG. 5, the reservation unit 2021 makes a reservation for the selected business operator. For example, the reservation unit 2021 transmits the type of work, the date and time of work, user information, vehicle information, and the like to a terminal of the selected business operator. The user information includes, for example, a user's name and contact information. The vehicle information includes, for example, a model, a body color, and a registration number of the vehicle 1 to be subjected to the work. The user information and the vehicle information may be input by the user by displaying an input screen for the user information and the vehicle information on the browser of the user terminal 300 before the screen in FIG. 3 is displayed.

When the reservation for the maintenance work is completed by the reservation unit 2021, information related to details of the reservation is sent from the reservation unit 2021 to the transmission unit 2022. The information sent from the reservation unit 2021 to the transmission unit 2022 includes, for example, the type of the maintenance work and the registration number of the vehicle 1.

The transmission unit 2022 transmits the work information to the server. The work information includes, for example, the type of the maintenance work reserved by the user and the registration number of the vehicle 1. Such work information is generated based on the information sent from the reservation unit 2021 to the transmission unit 2022. The transmission unit 2022 transmits the generated work information to the contract management server 100 via the communication unit 201.

The work information may be transmitted at a timing when the reserved maintenance work is completed. When the reserved maintenance work is completed, a work completion notification may be transmitted from the terminal of the business operator to the reservation management server 200. The transmission unit 2022 may transmit the work information to the contract management server 100 in response to reception of the work completion notification.

The storage unit 203 includes a main storage device and an auxiliary storage device similarly to the storage unit 303 of the user terminal 300. Programs stored in the auxiliary storage device include the program for implementing the functional modules such as the reservation unit 2021 and the transmission unit 2022.

The configuration of the reservation management server 200 is not limited to the example shown in FIG. 2, and any component may be added, changed, or omitted as appropriate.

Returning to FIG. 2, the contract management server 100 will be described. The contract management server 100 is a device that manages the lease contracts of the vehicle 1, and provides incentives to the users based on the work information from the reservation management server 200. The contract management server 100 can be configured by a general-purpose computer. That is, the contract management server 100 includes a communication unit 101, a control unit 102, and a storage unit 103.

The communication unit 101 is a communication interface similar to the communication unit 201 of the reservation management server 200, and communicates with other devices (for example, the reservation management server 200 or the user terminal 300) via the network.

The control unit 102 includes a processor and is responsible for control that is performed by the contract management server 100 similarly to the control unit 202 of the reservation management server 200. The control unit 102 in this example includes functional modules such as a management unit 1021, an acquisition unit 1022, and a providing unit 1023. These functional modules are implemented by the processor executing a program stored in the storage unit 103. A part or all of these functional modules may be implemented by a hardware circuit such as an ASIC or an FPGA.

The management unit 1021 manages a record of the predetermined action of the user. As described above, the predetermined action in this example is an action of requesting a business operator to perform maintenance work for the vehicle 1 via the reservation management server 200. The management unit 1021 manages registered information in a record management database (DB) 1032 described later based on the work information from the reservation management server 200.

The acquisition unit 1022 accesses the record management DB 1032 described later and acquires the record of the predetermined action of the user. The record of the predetermined user's action acquired by the acquisition unit 1022 is sent to the providing unit 1023.

The providing unit 1023 provides an incentive to a user having a record of the predetermined action at a level equal to or higher than a predetermined reference. Specifically, the providing unit 1023 determines whether the record of the predetermined action of the user is at a level equal to or higher than the predetermined reference. The providing unit 1023 may determine that the record of the predetermined action is at a level equal to or higher than the predetermined reference when a monthly occurrence count of requests for car washing via the reservation management server 200 is equal to or larger than a first threshold (for example, 2 or 3). The providing unit 1023 may determine that the record of the predetermined action is at a level equal to or higher than the predetermined reference when a monthly occurrence count of requests for body coating via the reservation management server 200 is equal to or larger than a second threshold (for example, 1). The providing unit 1023 may determine that the record of the predetermined action is at a level equal to or higher than the predetermined reference when the total of the monthly occurrence count of requests for car washing via the reservation management server 200 and the monthly occurrence count of requests for body coating via the reservation management server 200 is equal to or larger than a predetermined threshold (corresponding to a "fourth threshold" according to the present disclosure). The providing unit 1023 provides an incentive to the user when determination is made that the record of the predetermined action is at a level equal to or higher than the predetermined reference.

The incentive to be provided by the providing unit 1023 may be related to the lease contract of the vehicle 1. The user who has the lease contract of the vehicle 1 needs to pay a monthly usage fee. The providing unit 1023 may reduce the monthly usage fee as the incentive to be provided to the user. The monthly usage fee may be reduced only in a month next to the month when the record of the predetermined action is at a level equal to or higher than the predetermined reference, or in several months from the month next to the month when the record of the predetermined action is at a level equal to or higher than the predetermined reference. The length of the period during which the monthly usage fee is reduced may be changed depending on the type of the predetermined action. For example, the period may be longer when the predetermined action is a request for body coating than when the predetermined action is a request for car washing. The degree of reduction of the monthly usage fee may be changed depending on the type of the predetermined action. For example, the degree of reduction may be higher when the predetermined action is a request for body coating than when the predetermined action is a request for car washing.

The incentive to be provided by the providing unit 1023 may be relaxation of a restriction imposed in the lease contract. Examples of the restriction imposed in the lease contract include an upper limit of a monthly traveling distance. When the monthly traveling distance exceeds the upper limit, an additional fee may be charged to the user in addition to the monthly usage fee. The providing unit 1023 may increase the upper limit as the incentive to be provided to the user. The upper limit may be increased only in a month next to the month when the record of the predetermined action is at a level equal to or higher than the predetermined reference, or in several months from the month next to the month when the record of the predetermined action is at a level equal to or higher than the predetermined reference. The length of the period during which the upper limit is increased may be changed depending on the type of the predetermined action. For example, the period may be longer when the predetermined action is a request for body coating than when the predetermined action is a request for car washing. The degree of increase of the upper limit may be changed depending on the type of the predetermined action. For example, the degree of increase of the upper limit may be higher when the predetermined action is a request for body coating than when the predetermined action is a request for car washing.

The incentive to be provided by the providing unit 1023 is not limited to the one related to the lease contract of the vehicle 1, and may be granting of a right to modify the vehicle 1. The target of "modification" is herein a function different from the functions related to the traveling performance of the vehicle 1. Examples of such modification include a change of a lighting method of a blinker to a lighting method different from a default lighting method, a change of a display design of an instrument panel to a display design different from a default display design, and an upgrade of contents that can be reproduced on an in-vehicle multimedia device (for example, provision of video-on-demand (VOD) services free of charge).

Details of the incentive to be provided by the providing unit 1023 may be changed depending on a monthly occurrence count of the predetermined actions. For example, the details of the incentive may be changed depending on the monthly occurrence count of the predetermined actions among the reduction of the monthly usage fee, the increase of the upper limit of the monthly traveling distance, and the granting of the right to modify the vehicle 1.

The storage unit 103 includes a main storage device and an auxiliary storage device similarly to the storage unit 203 of the reservation management server 200. Programs stored in the auxiliary storage device include the program for implementing the functional modules such as the management unit 1021, the acquisition unit 1022, and the providing unit 1023. Databases such as a contract management DB 1031 and the record management DB 1032 are constructed in the auxiliary storage device. The contract management DB 1031 and the record management DB 1032 are constructed by a program of a database management system (DBMS) executed by the processor. Specifically, the DBMS program manages data stored in the auxiliary storage device to construct the contract management DB 1031 and the record management DB 1032. At that time, the contract management DB 1031 and the record management DB 1032 may be constructed as a relational database.

Information related to users who have lease contracts with the second business operator is registered in the contract management DB 1031. A structural example of the information registered in the contract management DB 1031 will be described with reference to FIG. 6. FIG. 6 is a diagram showing an example of a table structure of the information registered in the contract management DB 1031. The table registered in the contract management DB 1031 (may hereinafter be referred to as "contract information table") has fields for a user ID, a vehicle ID, a contract period, a monthly fee, and a usage restriction. The example of FIG. 6 shows contract information table for one user. When a plurality of users has lease contracts with the second business operator, contract information table for these users is registered in the contract management DB 1031. The structure of the contract information table is not limited to the example shown in FIG. 6, and any field may be added, changed, or deleted as appropriate.

Information for identifying a user (user ID) who has a lease contract with the second business operator is registered in the user ID field of the contract information table. The user ID is given by the second business operator when the user concludes the lease contract. The user ID may be a user's name, a user's e-mail address, or the like. Information for identifying a vehicle (vehicle ID) rented to the user who has the lease contract with the second business operator is registered in the vehicle ID field. In this example, the registration number of the vehicle 1 is used as the vehicle ID. A monthly usage fee specified in the lease contract is registered in the monthly fee field. An upper limit of a monthly traveling distance is registered in the usage restriction field.

Next, the record management DB 1032 will be described. Information related to records of the predetermined action of users who have lease contracts with the second business operator is registered in the record management DB 1032. FIG. 7 is a diagram showing an example of a table structure of the information registered in the record management DB 1032. The table registered in the record management DB 1032 (may hereinafter be referred to as "record information table") has fields for a vehicle ID, a user ID, and a record. The example of FIG. 7 shows record information table for one vehicle. When a plurality of vehicles is rented under the lease contracts, record information table for these vehicles is registered in the record management DB 1032. The structure of the record information table is not limited to the example shown in FIG. 7, and any field may be added, changed, or deleted as appropriate.

A vehicle ID of the vehicle 1 rented under the lease contract is registered in the vehicle ID field of the record information table. The vehicle ID registered in the vehicle ID field of the record information table is the same as the vehicle ID registered in the vehicle ID field of the contract information table. A user ID of a user who rents the vehicle 1 is registered in the user ID field. The user ID registered in the user ID field of the record information table is the same as the user ID registered in the user ID field of the contract information table. Information related to a record of the predetermined action is registered in the record field. In the record field of this example, an occurrence count of the predetermined actions is registered for each type of maintenance work. The type of maintenance work is a type of maintenance work requested by the user via the reservation management server 200, and includes car washing and body coating in this example. The occurrence count of the predetermined actions is a monthly occurrence count of the predetermined actions. For example, when the car washing is requested via the reservation management server 200 twice a month, information "twice a month" is registered as an occurrence count associated with the car washing. When the body coating is requested via the reservation management server 200 once a month, information "once a month" is registered as an occurrence count associated with the body coating. These occurrence counts are managed by the management unit 1021. That is, the management unit 1021 updates the occurrence counts in the record field every time the work information is received from the reservation management server 200. The management unit 1021 resets the occurrence counts in the record field to zero every time the month changes.

The configuration of the contract management server 100 is not limited to the example shown in FIG. 2, and any component may be added, changed, or omitted as appropriate.

Processing Flows

Figure 8:
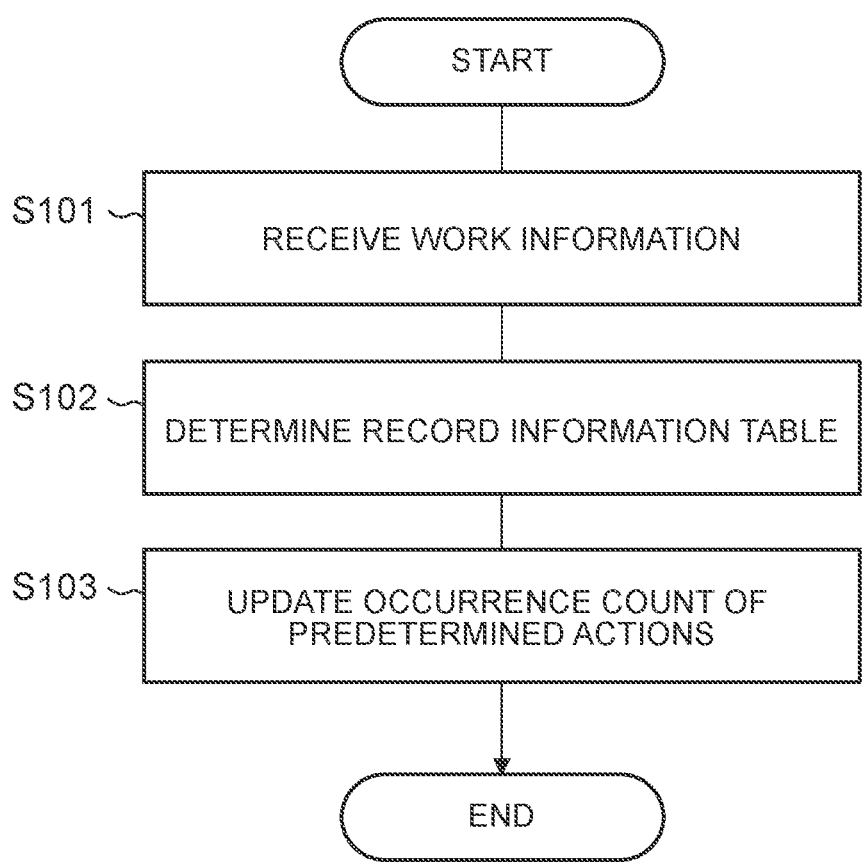
FIG. 8 is a flowchart showing a processing routine to be executed by the contract management server in response to reception of work information from the reservation management server.
Figure 9:
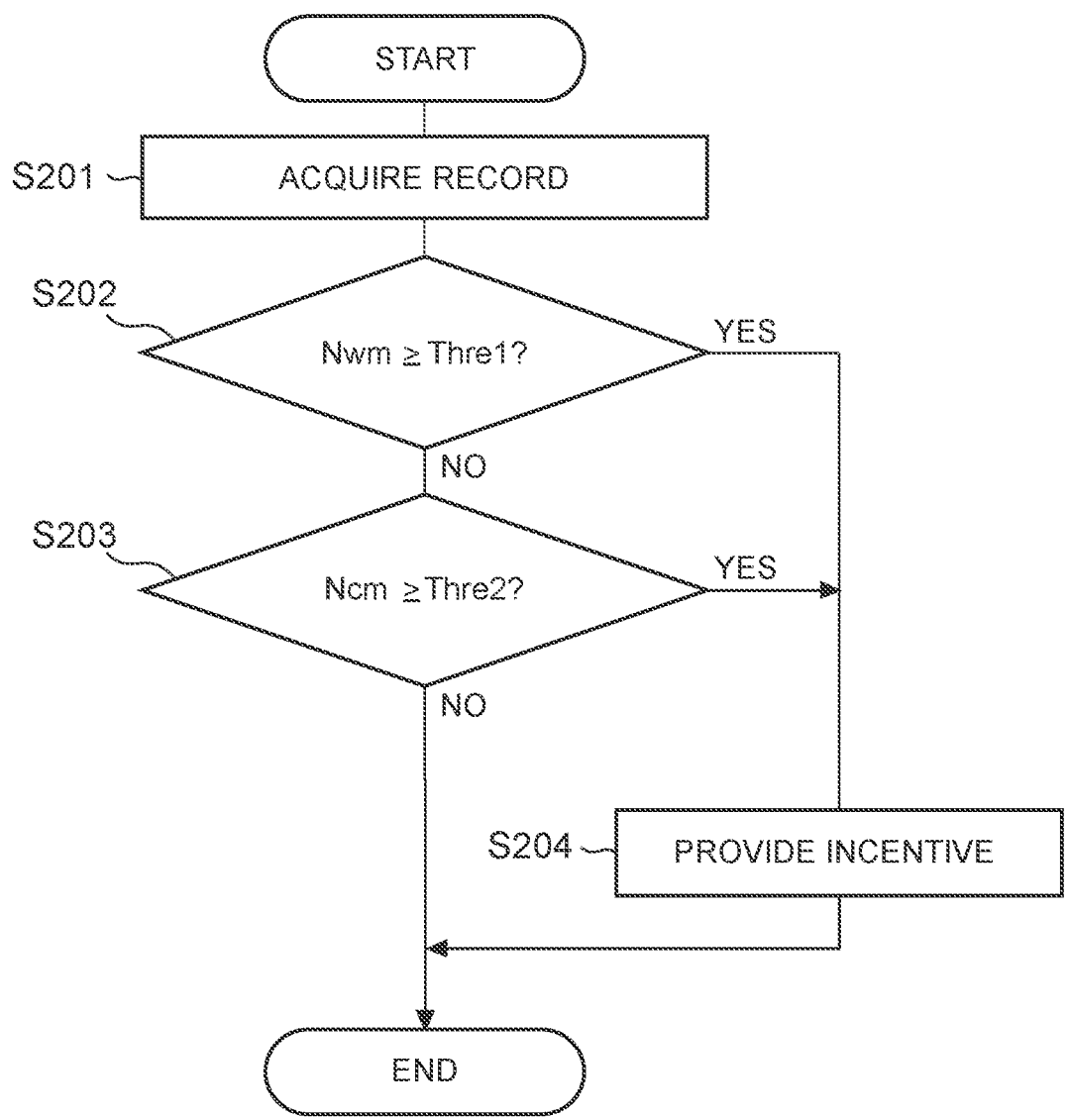
FIG. 9 is a flowchart showing a processing routine to be executed by the contract management server at a predetermined timing.

Flows of processes to be executed by the contract management server 100 will be described with reference to FIGS. 8 and 9. FIG. 8 is a flowchart showing a processing routine to be executed by the contract management server 100 in response to reception of work information from the reservation management server 200. FIG. 9 is a flowchart showing a processing routine to be executed by the contract management server 100 at a predetermined timing (for example, a timing when the month changes). The main executor of the processing routines of FIGS. 8 and 9 is the control unit 102 (processor) of the contract management server 100, but description is given under the assumption that the main executor is each of the functional modules of the contract management server 100.

In FIG. 8, the communication unit 101 of the contract management server 100 receives work information from the reservation management server 200 (Step 101). Then, the management unit 1021 accesses the record management DB 1032 by using a registration number in the work information as an argument to determine a record information table of the vehicle 1 to be subjected to maintenance work (Step 102). When the management unit 1021 finishes executing the process of Step 102, the management unit 1021 executes a process of Step 103.

In Step 103, the management unit 1021 updates the occurrence count of the predetermined actions in the record information table determined in Step 102. Specifically, the management unit 1021 determines the type of the maintenance work reserved by the user based on the work information. Subsequently, the management unit 1021 increments an occurrence count associated with the determined type of the maintenance work by one in the record field of the record information table. For example, when the type of the maintenance work requested by the user via the reservation management server 200 is car washing, the management unit 1021 increments the occurrence count associated with the car washing by one. When the type of the maintenance work requested by the user via the reservation management server 200 is body coating, the management unit 1021 increments the occurrence count associated with the body coating by one. After the process of Step 103 is executed, the execution of this processing routine is terminated.

In FIG. 9, the acquisition unit 1022 of the contract management server 100 acquires, at a predetermined timing, a record of the predetermined action of the user who has the lease contract with the second business operator (Step 201). Specifically, the acquisition unit 1022 accesses the record management DB 1032 to read occurrence counts registered in the record field of the record information table in association with the individual types of maintenance work. The occurrence counts associated with the individual types of maintenance work are sent from the acquisition unit 1022 to the providing unit 1023.

The providing unit 1023 executes a process of Step 202 in response to reception of the occurrence counts associated with the individual types of maintenance work. In Step 202, the providing unit 1023 determines whether a monthly occurrence count of requests for car washing made by the user via the reservation management server 200 (Nwm in FIG. 9) among the occurrence counts associated with the individual types of maintenance work is equal to or larger than the first threshold (Thre1 in FIG. 9). When the occurrence count Nwm is smaller than the first threshold Thre1 (negative determination in Step 202), the providing unit 1023 executes a process of Step 203.

In Step 203, the providing unit 1023 determines whether a monthly occurrence count of requests for body coating made by the user via the reservation management server 200 (Ncm in FIG. 9) among the occurrence counts associated with the individual types of maintenance work is equal to or larger than the second threshold (Thre2 in FIG. 9). When the occurrence count Ncm is smaller than the second threshold Thre2 (negative determination in Step 203), the execution of this processing routine is terminated.

When the occurrence count Nwm is equal to or larger than the first threshold Thre1 (positive determination in Step 202) or when the occurrence count Ncm is equal to or larger than the second threshold Thre2 (positive determination in Step 203), the providing unit 1023 executes a process of Step 204.

In Step 204, the providing unit 1023 provides an incentive to the user. For example, the providing unit 1023 reduces a monthly usage fee for the lease contract, increases an upper limit of a monthly traveling distance, or grants a right to modify the vehicle 1. When the provision of the incentive is the reduction of the monthly usage fee, the providing unit 1023 may reduce the monthly usage fee in a next month or in several months from the next month. For example, when the user is billed based on an amount registered in the monthly fee field of the contract information table, the providing unit 1023 may reduce the amount registered in the monthly fee field of the contract information table. When the provision of the incentive is the increase of the upper limit of the monthly traveling distance, the providing unit 1023 may stop charging an additional fee in a next month or in several months from the next month even if the monthly traveling distance exceeds the upper limit but the excess is within the range of the increase. For example, the providing unit 1023 may increase the upper limit of the monthly traveling distance registered in the usage restriction field of the contract information table. When the provision of the incentive is the granting of the right to modify the vehicle 1, the providing unit 1023 may transmit, to the user terminal 300, a coupon for modification of the vehicle 1 free of charge.

When a plurality of users has lease contracts with the second business operator, the processing routine of FIG. 9 is executed for each of the users.

According to the embodiment described above, when the record of the predetermined action of the user who is using the lease service is at a level equal to or higher than the predetermined reference, an incentive is provided to the user. As a result, the user who is using the lease service can be motivated to make the record of the predetermined action reach a level equal to or higher than the predetermined reference. Since the predetermined action is an action for maintaining the commercial value of the vehicle 1, a decrease in the commercial value of the vehicle 1 in the lease contract period can be suppressed when the user can be motivated to make the record of the predetermined action reach a level equal to or higher than the predetermined reference.

First Modification

In the embodiment described above, the user's action for requesting the business operator to perform car washing or body coating via the reservation management server 200 is exemplified as the predetermined action. A user's action for washing the vehicle 1 or coating the body of the vehicle 1 may be the predetermined action.

The occurrence of the user's action for washing the vehicle 1 or coating the body of the vehicle 1 may be determined by analyzing an image captured by an in-vehicle camera. For example, when the vehicle 1 includes a camera capable of imaging the surroundings of the vehicle 1 as in a driving recorder, the image captured by the camera may periodically be transmitted from the vehicle 1 to the contract management server 100. The contract management server 100 may determine whether the action of washing the vehicle 1 or coating the body of the vehicle 1 has occurred by analyzing the image received from the vehicle 1. When determination is made that the action of washing the vehicle 1 or coating the body of the vehicle 1 has occurred, the contract management server 100 may update the occurrence count registered in the record field of the record information table. The contract management server 100 may provide an incentive to the user when the record of the predetermined action is at a level equal to or higher than the predetermined reference.

According to this modification, it is possible to reduce the cost for making the record of the predetermined action reach a level equal to or higher than the predetermined reference. Thus, it is possible to increase the benefit of the user by providing the incentive. As a result, the user can further be motivated to make the record of the predetermined action reach a level equal to or higher than the predetermined reference.

Second Modification

In the embodiment described above, the user's action for requesting the business operator to perform car washing or body coating via the reservation management server 200 is exemplified as the predetermined action. An action for avoiding damage to the body of the vehicle 1 may be the predetermined action.

One of the effective methods for suppressing damage to the body is, for example, to park the vehicle 1 at a place where the vehicle 1 is not easily damaged by another vehicle in a public parking lot. Examples of the place where the vehicle 1 is not easily damaged by another vehicle include a place having a low parking density in a public parking lot. Therefore, the predetermined action may be an action of parking the vehicle 1 at a place having a low parking density in a public parking lot.

The occurrence of the action of parking the vehicle 1 at a place having a low parking density in a public parking lot may be determined by analyzing an image captured by the in-vehicle camera. The determination as to whether the record of the predetermined action is at a level equal to or higher than the predetermined reference may be made based on the ratio between an occurrence count of the actions of parking the vehicle 1 in a public parking lot (may hereinafter be referred to as "first occurrence count") and an occurrence count of the actions of parking the vehicle 1 at a place having a low parking density in the public parking lot (may hereinafter be referred to as "second occurrence count"). For example, the contract management server 100 may determine that the record of the predetermined action is at a level equal to or higher than the predetermined reference when the ratio of the second occurrence count to the first occurrence count is equal to or higher than a third threshold (for example, 60% to 70%).

According to this modification, the user can be motivated to park the vehicle 1 at a place having a low parking density in a public parking lot. Therefore, it is possible to reduce the risk of damage to the body of the vehicle 1 in the lease contract period. As a result, it is possible to suppress a decrease in the commercial value of the vehicle 1 in the lease contract period.

Others

The embodiment and modifications described above are only examples, and the present disclosure may be modified as appropriate without departing from the gist of the present disclosure. For example, a part or all of the processes performed by the contract management server 100 may be performed by the reservation management server 200. Further, a part or all of the processes performed by the reservation management server 200 may be performed by the contract management server 100.

For example, the processes and means described in the present disclosure may be combined as desired as long as no technical contradiction occurs. For example, the embodiment and the first and second modifications may be combined if possible. The process described as being executed by a single device may be executed by a plurality of devices in cooperation. Alternatively, the process described as being executed by different devices may be executed by a single device. In the computer system, the hardware configuration that implements functions may be changed flexibly.

The present disclosure may be embodied such that a computer program that implements the functions described in the embodiment described above (information processing program) is supplied to a computer and is read and executed by one or more processors of the computer. The computer program may be provided to the computer by being stored in a non-transitory computer-readable storage medium connectable to a system bus of the computer, or may be provided to the computer via a network. The non-transitory computer-readable storage medium is a recording medium that can store information such as data and programs by electrical, magnetic, optical, mechanical, or chemical action and can be read from a computer or the like. Examples of the recording medium include any types of disk or disc such as magnetic disks (for example, a floppy (registered trademark) disk and an HDD) and optical discs (for example, a CD-ROM, a DVD, and a Blu-ray disc). Examples of the recording medium also include media such as a ROM, a RAM, an EPROM, an electrically erasable programmable read-only memory (EEPROM), a magnetic card, a flash memory, an optical card, and a solid state drive (SSD).

What is claimed is:

1. An information processing device comprising:
   a memory storing a program; and
   a processor communicatively coupled to the memory, wherein the processor is configured to execute the program to:
   acquire a record of a predetermined action for maintaining a commercial value of a first vehicle by a first user who rents the first vehicle from a first service that is a vehicle rental service; and
   provide an incentive to the first user when the record of the predetermined action is at a level equal to or higher than a predetermined reference,
   wherein the predetermined action has an action for parking the first vehicle at a place having a low parking density in a public parking lot, and
   wherein the processor is further configured to further execute the program to:
      determine that the record of the predetermined action is at the level equal to or higher than the predetermined reference when a ratio of a first occurrence frequency of the action for parking the first vehicle at the place having the low parking density in the public parking lot to a second occurrence frequency of an action for parking the first vehicle in the public parking lot is equal to or higher than a first threshold; and
      determine whether the action for parking the first vehicle at the place having the low parking density in the public parking lot has occurred by analyzing an image captured by an in-vehicle camera mounted on the first vehicle.

2. The information processing device according to claim 1, wherein:
   the predetermined action has an action for washing the first vehicle; and
   the processor is further configured to further execute the program to determine that the record of the predetermined action is at the level equal to or higher than the predetermined reference when a frequency of occurrence of the action for washing the first vehicle is equal to or higher than a second threshold.

3. The information processing device according to claim 1, wherein:
   the predetermined action has an action for coating a body of the first vehicle; and
   the processor is further configured to further execute the program to determine that the record of the predetermined action is at the level equal to or higher than the predetermined reference when a frequency of occurrence of the action for coating the body of the first vehicle is equal to or higher than a second threshold.

4. The information processing device according to claim 1, wherein:
   the predetermined action has an action for using a second service related to maintenance of a vehicle commercial value; and
   the processor is further configured to further execute the program to determine that the record of the predetermined action is at the level equal to or higher than the predetermined reference when an occurrence frequency of the action of using the second service is equal to or higher than a second threshold.

5. The information processing device according to claim 4, wherein the second service is a platform service that acts as a proxy for a procedure to make a work request on a business operator that performs work for maintaining the vehicle commercial value.

6. The information processing device according to claim 1, wherein:
   the first service is a service that grants a right to use the first vehicle to the first user by periodically receiving payment of a fee from the first user; and
   the processor is further configured to further execute the program to reduce the fee as provision of the incentive.

7. The information processing device according to claim 1, wherein:
   the first service is a service in which an upper limit is set on a traveling distance of the first vehicle; and
   the processor is further configured to further execute the program to increase the upper limit as provision of the incentive.

8. The information processing device according to claim 1, wherein the processor is further configured to further execute the program to provide, as provision of the incentive, a right to modify a function different from a function related to traveling performance of the first vehicle.

9. An information processing method comprising:
   acquiring a record of a predetermined action for maintaining a commercial value of a first vehicle by a first user who rents the first vehicle from a first service that is a vehicle rental service; and
   providing an incentive to the first user when the record of the predetermined action is at a level equal to or higher than a predetermined reference, wherein the predetermined action has an action for parking the first vehicle at a place having a low parking density in a public parking lot, and wherein the information processing method further comprises:

determining that the record of the predetermined action is at the level equal to or higher than the predetermined reference when a ratio of a first occurrence frequency of the action for parking the first vehicle at the place having the low parking density in the public parking lot to a second occurrence frequency of an action for parking the first vehicle in the public parking lot is equal to or higher than a first threshold; and determining whether the action for parking the first vehicle at the place having the low parking density in the public parking lot has occurred by analyzing an image captured by an in-vehicle camera mounted on the first vehicle.

10. The information processing method according to claim 9, wherein:

the predetermined action has an action for using a second service related to maintenance of a vehicle commercial value; and the information processing method further comprises determining that the record of the predetermined action is at the level equal to or higher than the predetermined reference when an occurrence frequency of the action of using the second service in a predetermined period is equal to or higher than a second threshold.

11. The information processing method according to claim 10, wherein the second service is a platform service that acts as a proxy for a procedure to make a work request on a business operator that performs work for maintaining the vehicle commercial value.

12. The information processing method according to claim 9, wherein:

the first service is a service that grants a right to use the first vehicle to the first user by periodically receiving payment of a fee from the first user; and the information processing method further comprises reducing the fee as provision of the incentive.

13. The information processing method according to claim 9, wherein:

the first service is a service in which an upper limit is set on a traveling distance of the first vehicle; and the information processing method further comprises increasing the upper limit as provision of the incentive.

14. The information processing method according to claim 9, further comprising:

providing a right to modify a function different from a function related to traveling performance of the first vehicle as provision of the incentive.

15. An information processing system comprising:

a first device configured to perform a process related to a first service that is a vehicle rental service; and a second device configured to provide online a second service related to maintenance of a vehicle rented in the first service, wherein the first device is configured to:

acquire, from the second device, a record of usage of the second service by a first user who rents a first vehicle from the first service, and provide an incentive to the first user when the record of usage of the second service is at a level equal to or higher than a predetermined reference, wherein the second service has an action for parking the first vehicle at a place having a low parking density in a public parking lot, and wherein the first device is further configured to:

determine that the record of usage of the second service is at the level equal to or higher than the predetermined reference when a ratio of a first occurrence frequency of the action for parking the first vehicle at the place having the low parking density in the public parking lot to a second occurrence frequency of an action for parking the first vehicle in the public parking lot is equal to or higher than a first threshold; and determine whether the action for parking the first vehicle at the place having the low parking density in the public parking lot has occurred by analyzing an image captured by an in-vehicle camera mounted on the first vehicle.

16. The information processing system according to claim 15, wherein the first device is further configured to determine that the record of usage of the second service is at the level equal to or higher than the predetermined reference when an occurrence frequency of an action of using the second service is equal to or higher than a second threshold.

17. The information processing system according to claim 15, wherein:

the first service is a service that grants a right to use the first vehicle to the first user by periodically receiving payment of a fee from the first user; and the first device is further configured to reduce the fee as provision of the incentive.

18. The information processing system according to claim 15, wherein:

the first service is a service in which an upper limit is set on a traveling distance of the first vehicle; and the first device is further configured to increase the upper limit as provision of the incentive.

19. The information processing system according to claim 15, wherein the first device is further configured to provide, as provision of the incentive, a right to modify a function different from a function related to traveling performance of the first vehicle.

* * * * *